United States Patent [19]

Waskiewicz et al.

[11] Patent Number: 5,509,737
[45] Date of Patent: Apr. 23, 1996

[54] BEARING WITH A SEAL-THRUST WITHSTANDING MEMBER

[75] Inventors: Walter P. Waskiewicz, Bristol; Daniel R. McLarty, Burlington, both of Conn.

[73] Assignee: The Torrington Company, Torrington, Conn.

[21] Appl. No.: 333,177

[22] Filed: Nov. 2, 1994

[51] Int. Cl.$^6$ ................................................. F16C 33/74
[52] U.S. Cl. ........................................ 384/138; 384/130
[58] Field of Search ................................. 384/138, 130, 384/127

[56] References Cited

U.S. PATENT DOCUMENTS

| | | |
|---|---|---|
| 2,906,562 | 9/1959 | Burgman ........................ 384/130 X |
| 3,294,456 | 12/1966 | Williams et al. . |
| 3,495,859 | 2/1970 | Hassan ........................... 384/138 X |
| 3,554,560 | 1/1971 | Miyake . |
| 3,596,533 | 8/1971 | Nightingale .................... 384/127 X |
| 3,829,173 | 8/1974 | Stedman ......................... 384/138 X |
| 4,162,110 | 7/1979 | Gardella . |
| 4,166,627 | 9/1979 | Bainard et al. ...................... 277/95 |
| 4,199,199 | 4/1980 | Granda ........................... 384/138 X |
| 4,252,385 | 2/1981 | Leitzel ................................ 384/138 |
| 4,270,759 | 6/1981 | Denton et al. ......................... 277/1 |

*Primary Examiner*—Thomas R. Hannon
*Attorney, Agent, or Firm*—John C. Bigler

[57] ABSTRACT

A track roller or cam follower type bearing has seal-thrust withstanding members. The sealing function and the thrust withstanding function are performed by a single structure.

4 Claims, 3 Drawing Sheets

5,509,737

BEARING WITH A SEAL-THRUST WITHSTANDING MEMBER

BACKGROUND OF THE INVENTION

This invention relates to bearings. More particularly this invention is a track roller or cam follower type bearing including an annular seal-thrust withstanding member which has an elastomer portion and a portion made of material adapted to withstand dynamic thrust.

Track rollers, cam followers, and other similar type bearings, often operate in environments that are very dirty and where large amounts of fluids are present. In order to protect the internal operating components and functional surfaces from these damaging contaminants, sealing is needed. In addition, operating loads, mechanism construction, wear, alignment, and other factors often result in significant thrust loading. When these conditions exist, it is imperative that the interface of the parts of the bearing subject to the thrust loading have thrust withstanding capability. If this feature is not incorporated in the bearing, significant friction and wear will result.

The foregoing illustrates limitations known to exist in present devices and methods. Thus, it is apparent that it would be advantageous to provide an alternative directed to overcoming one or more of the limitations set forth above. Accordingly, a suitable alternative is provided, including features more fully disclosed hereinafter.

SUMMARY OF THE INVENTION

In one aspect of the invention, this is accomplished by providing a bearing with an inner annular member and an outer annular member with an annular space between them. The inner and outer annular members each have a radially extending thrust bearing surface facing one another and axially spaced from one another. A seal-thrust withstanding member performs both the function of sealing the annular space between the inner and outer annular members and also providing thrust withstanding capability. The annular seal-thrust withstanding member has an elastomer portion extending across the annular space between the inner and outer annular members. The elastomer portion is in contact with each of said inner and outer annular members. The annular seal-thrust withstanding member also has a portion made of a material adapted to withstand dynamic thrust. This portion of the seal-thrust withstanding member is in contact with the radially extending thrust bearing surface of the inner annular member and the radially extending thrust bearing surface of the outer annular member.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

In the various Figures, like parts are referred to by like numbers.

The invention to be described herein is particularly useful in a track roller type bearing and will be described in detail with regard to its use in a track roller. This particular track roller type bearing is very useful as an aircraft track roller. However, the system can be used in other bearing types where thrust loads and axial positioning is desired such as in a cam follower.

Figure 1:
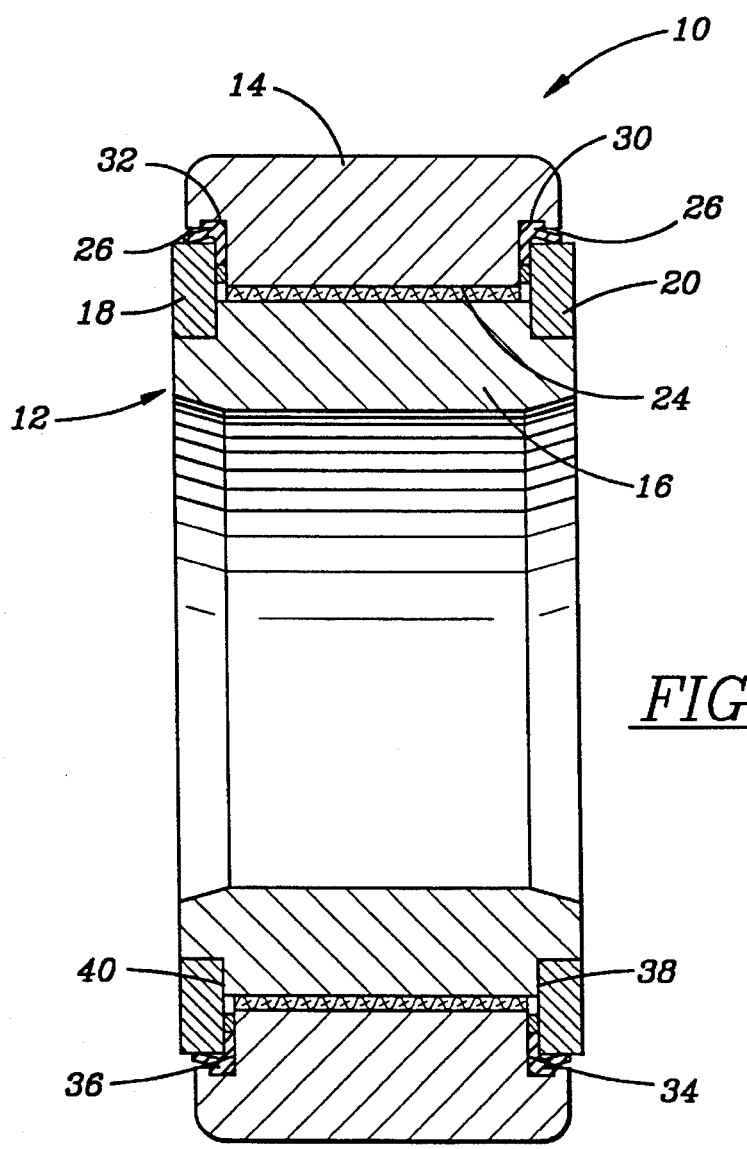
FIG. 1 is a sectional view of a first preferred embodiment of our invention.

Referring to the drawings, FIG. 1 shows a track roller 10. The track roller includes an inner annular member indicated generally by the number 12 and an outer annular member 14. The inner annular member 12 includes an annular race 16 and the washers 18 and 20 at the longitudinal ends of the race 16. The race 14 is rotatable about the race 16. For this purpose, a fabric liner 22 (see FIG. 2) is provided between the bore of the race 14 and the outer surface of the race 16. The fabric liner 22 has a low-friction slide surface layer and may be of the type shown in U.S. Pat. No. 4,358,167, entitled "BEARING ELEMENT" issued Nov. 9, 1982 to Harry Magazian, et. al. of course, other anti-friction members such as rollers may be used in place of the fabric liner 22.

The outer annular member 14 has a bore 24 and counterbores 26 and 28 in its axial ends. The raceway of the outer annular member 14 is positioned lengthwise between the counterbores 26 and 28 and bears upon the fabric liner 22.

Recesses 30 and 32 are located adjacent to the counterbores 26 and 28, respectively. The diameters of the counter bores 26 and 28 and the recesses 30 and 32 are greater than the outside diameter of the washer portions 18 and 20 of the inner annular member 12. Therefore, an annular space is provided at each axial end of the inner annular member 12 and the outer annular member 14.

The outer annular member 14 has radially extending thrust bearing surfaces 34 and 36. The washer portion of the inner annular member 12 has radially extending thrust bearing surfaces 38 and 40. Thrust bearing surfaces 34 and 38 face one another and are axially spaced apart. Thrust bearing radially extending surfaces 36 and 40 face one another and are axially spaced apart. The direction of the thrusts are shown by the arrows in FIG. 2.

Figure 2:
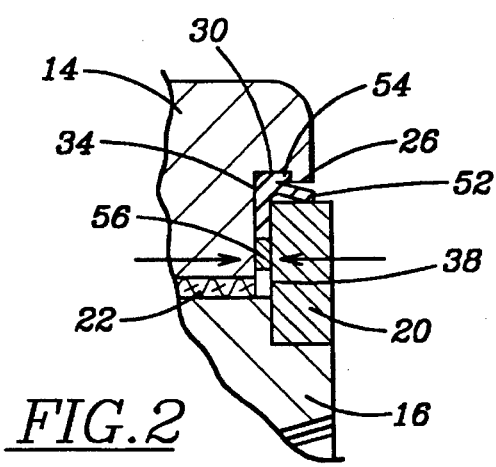
FIG. 2 is a sectional view of a portion of the embodiment of FIG. 1 and on an enlarged scale.
Figure 3:
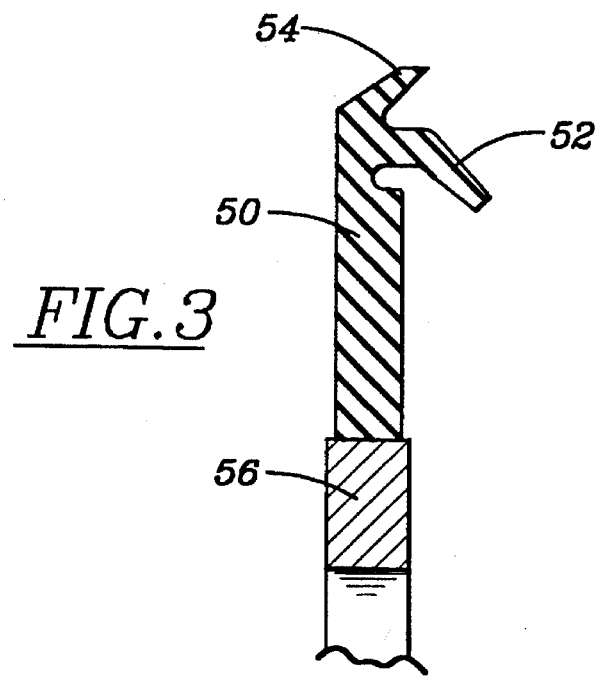
FIG. 3 is a sectional view on an enlarged scale of the annular seal-thrust withstanding member of FIG. 1 and FIG. 2.

In accordance with the invention and referring to FIG. 2 and FIG. 3 there is shown a preferred embodiment of an annular seal-thrust withstanding member. Lip support 50 supports the lips 52 and 54. The lip support and the lips are made of an elastomer. When the annular seal-thrust withstanding member is assembled into the track roller, the lips being very flexible, extend across the annular space separating the washer 20 of inner annular member 12 and the outer annular member 14. The lip 54 snaps into the recess 30 of the outer annular member 14 and the lip 52 remains in wiping contact with the outside surface of the washer 20.

A ring 56 made of a material adapted to withstand dynamic thrust is press fit into the bore of the elastomer portion. As can be seen by reference to FIG. 2, the ring 56 is in the space separating the radially extending thrust bearing surfaces 34 and 38. The entire ring 56 is radially inwardly spaced from the annular space at each axial end of the inner annular member 12 and the outer annular member 14 and therefore is located entirely in the area where the thrust occurs as indicated by the arrows in FIG. 2.

Figure 4:
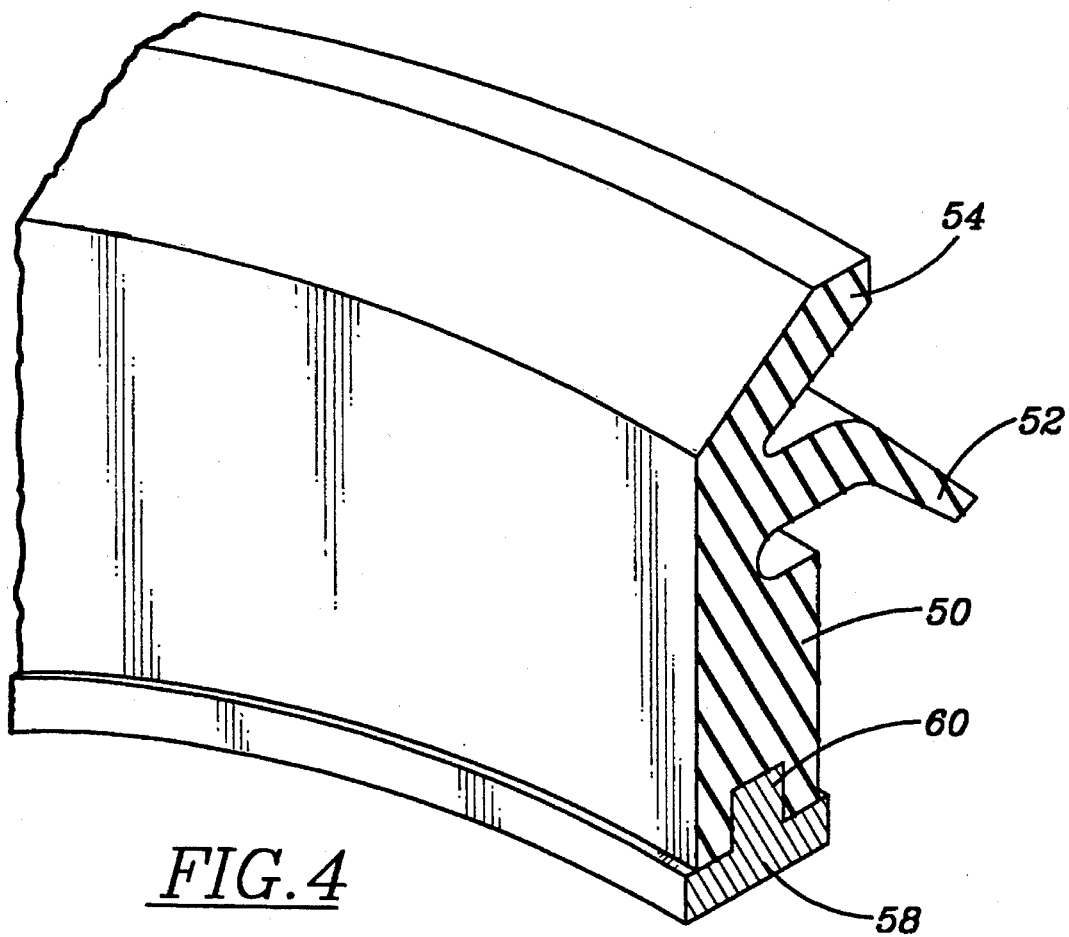
FIG. 4 is a perspective view of another preferred embodiment of our invention.

In the embodiment shown in FIG. 4, the ring 58 is connected to the base of the elastomeric lip support 50. An annular protrusion 60 extends into the elastomeric lip support 50 to retain the ring in the support. The ring may be insert molded or mechanically installed.

Figure 5:
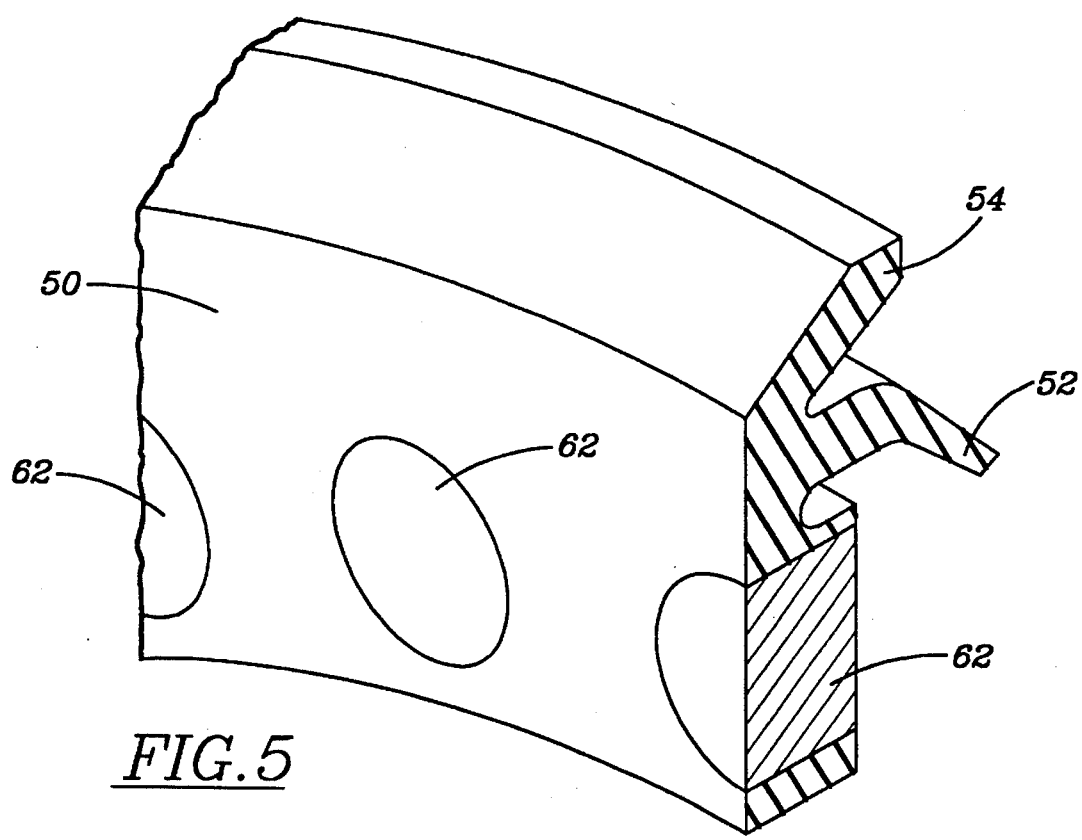
FIG. 5 is a perspective view partly in section of still another preferred embodiment of our invention.

In the embodiment of FIG. 5 a plurality of circumferentially spaced buttons are located in the elastomeric lip support 50 and radially spaced from the bore of the support 50.

Figure 6:
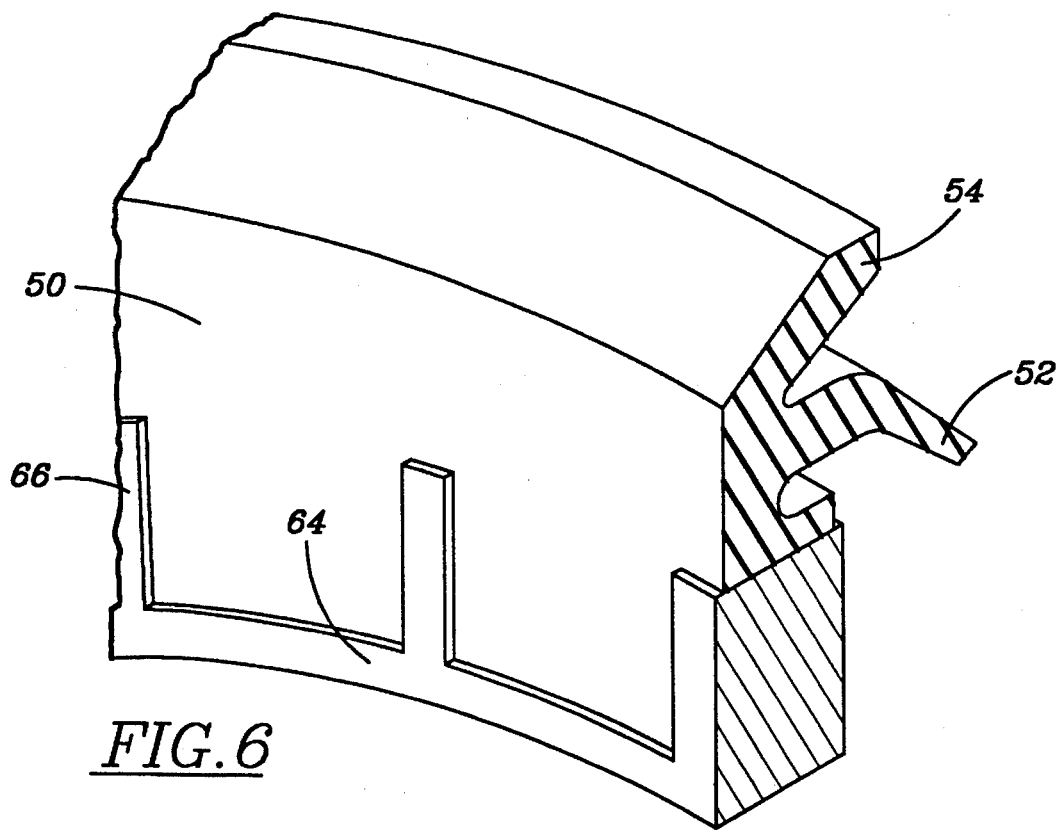
FIG. 6 is a perspective view partly in section of still another preferred embodiment of our invention.

In the embodiment of FIG. 6 the ring 64 is provided with circumferentially separated protrusions 66 located on the inner surface of the elastomeric lip support 50 and extending radially into the elastomeric portion 50. The ring may be insert injection molded or mechanically inserted.

The elastomer portion of the seal-thrust withstanding member is made of a flexible elastomer or thermoplastic elastomer materials. These materials allow a design that can be distorted at assembly to provide a positive 360 degrees of contact of the elastomer lip on the riding surface. The material selected must also be able to withstand application conditions such as high and low temperatures, fluid and gas contaminates, and abrasive solids.

Unfortunately, good flexible sealing materials are not capable of standing dynamic thrust loading. Therefore, in order to have a single part act as a seal and also as a thrust withstanding member, two sets of material properties are needed. Bearing-grade polymers such as polymides, polyether ketones, and others as well as a lubricant impregnated porous metal can be utilized for withstanding dynamic thrust.

The thrust withstanding capacity of the assembly can be adjusted by adjusting the surface area of the material in the assembly which is adapted to withstand the dynamic thrust. For example, if the embodiment of FIG. 5 is used, six buttons could be used for heavy loads; two buttons for light loads.

Having described the invention, what is claimed is:

1. A bearing comprising:

an inner annular member and an outer annular member with an annular space between said annular members;

the inner annular member and the outer annular member each having a radially extending thrust bearing surface facing one another and axially spaced from one another;

an annular seal-thrust withstanding member having an elastomer portion extending across said annular space and in contact with each of said inner and outer annular members;

said annular seal-thrust withstanding member having a thrust portion made of material adapted to withstand dynamic thrust and in contact with said inner annular member and outer annular member radially extending thrust bearing surfaces, the thrust portion being a separate ring which has been press fit into the bore of the elastomer portion.

2. A bearing comprising:

an inner annular member and an outer annular member with an annular space between said annular members;

the inner annular member and the outer annular member each having a radially extending thrust bearing surface facing one another and axially spaced from one another;

an annular seal-thrust withstanding member having an elastomer portion extending across said annular space and in contact with each of said inner and outer annular members;

said annular seal-thrust withstanding member having a thrust portion made of material adapted to withstand dynamic thrust and in contact with said inner annular member and outer annular member radially extending thrust bearing surfaces, the thrust portion being a ring connected to the inside surface of the elastomer portion, said ring having an annular protrusion extending into the elastomer portion to retain the ring in the elastomer portion.

3. A bearing comprising:

an inner annular member and an outer annular member with an annular space between said annular members;

the inner annular member and the outer annular member each having a radially extending thrust bearing surface facing one another and axially spaced from one another;

an annular seal-thrust withstanding member having an elastomer portion extending across said annular space and in contact with each of said inner and outer annular members;

said annular seal-thrust withstanding member having a thrust portion made of material adapted to withstand dynamic thrust and in contact with said inner annular member and outer annular member radially extending thrust bearing surfaces, the thrust portion being a plurality of circumferentially spaced buttons.

4. A bearing comprising:

an inner annular member and an outer annular member with an annular space between said annular members;

the inner annular member and the outer annular member each having a radially extending thrust bearing surface facing one another and axially spaced from one another;

an annular seal-thrust withstanding member having an elastomer portion extending across said annular space and in contact with each of said inner and outer annular members;

said annular seal-thrust withstanding member having a thrust portion made of material adapted to withstand dynamic thrust and in contact with said inner annular member and outer annular member radially extending thrust bearing surfaces, the thrust portion being a ring with circumferentially separated protrusions extending into the elastomer portion.

* * * * *